Patented Sept. 29, 1925.

1,555,674

UNITED STATES PATENT OFFICE.

EMIL KELLNER, OF KALAMAZOO, MICHIGAN.

PROCESS OF DEINKING PAPER.

No Drawing. Application filed August 22, 1924. Serial No. 733,660.

*To all whom it may concern:*

Be it known that I, EMIL KELLNER, a citizen of Germany, residing at Kalamazoo, in the county of Kalamazoo and State of Michigan, have invented new and useful Improvements in Processes of Deinking Paper, of which the following is a specification.

The present invention relates to the process of removing ink from printed paper, including newspaper, and also for removing the wax from waxed paper.

In accordance with the present invention, I place the waste paper, say news or printed book paper, say 2,000 pounds, into a beater, and with water in the amount usually employed in making a pulp, and the mixture is then heated (e. g. by blowing in steam) up to about 75° C. I then allow the beater to run until the stock has been reduced to fine uniform pulp, and I then add 100 pounds of soda ash, and again apply heat until the temperature goes up to about 90° C. I then add a solution of 20 pounds of chloride of lime in water, together with a suspension of 5 pounds of finely pulverized sulphur in water, after which the beater can be allowed to run for half an hour or so, at the end of which time it will be found that the ink and the filler or loading material have been completely separated from the paper stock, and the stock left in a clean state. The pulp is then washed in the well known or any suitable manner until all of the chemicals are washed out. The washing operation may require about two hours.

It will be seen that the chemicals used are relatively cheap materials, and that the cost for extra labor is extremely low, so that the entire cost of recovering the paper is very small. A good yield of pulp is secured.

A particular advantage of my process is that it is also applicable to waxed paper, whether or not the same contains printing thereupon, the operation of treating waxed paper being precisely the same as above stated.

It will be obvious that after the washing the pulp can be run into sheets of the desired thickness, either alone or with other paper stock, or can be used in any other manner.

I claim:

1. The process which comprises pulping waste paper to be reworked at about 75° C., adding soda ash, heating to about 90° C., and mixing, then adding chloride of lime and sulphur, and again beating for a short period, and washing.

2. A process which comprises pulping waste paper in warm water, adding soda and heating up to about 90° C., and thereafter mixing chloride of lime and sulphur with the pulp, and thereafter washing the pulp.

In testimony whereof I affix my signature.

EMIL KELLNER.